Figure 12:
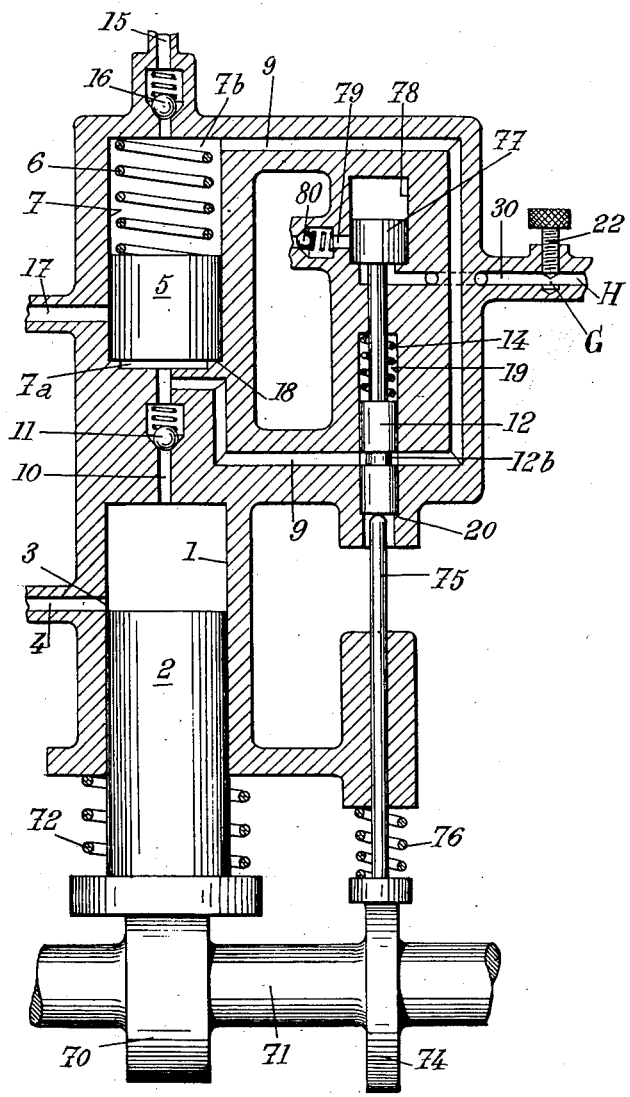

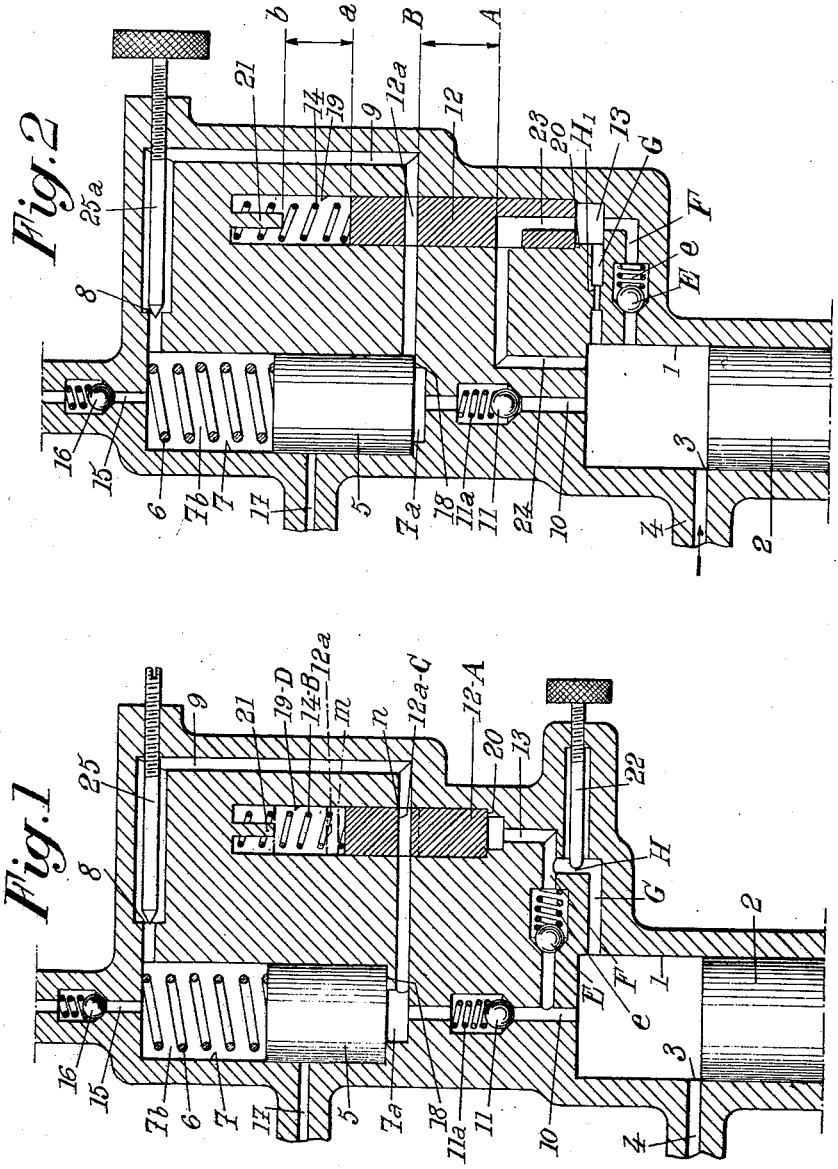

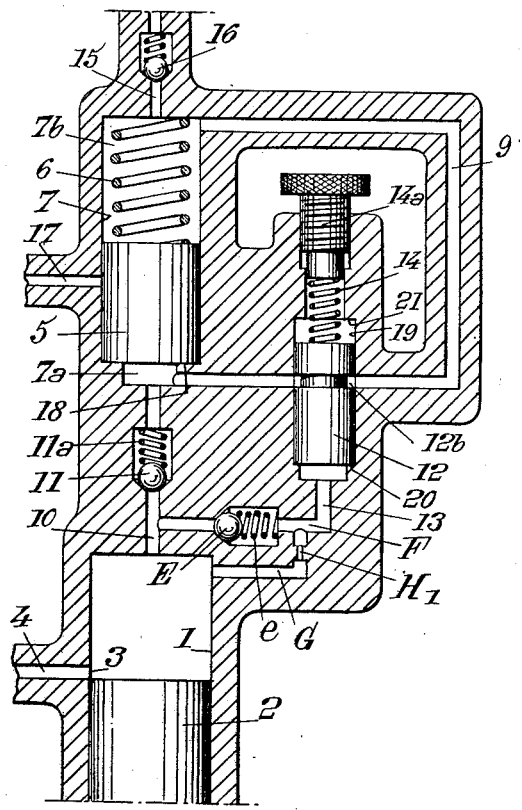

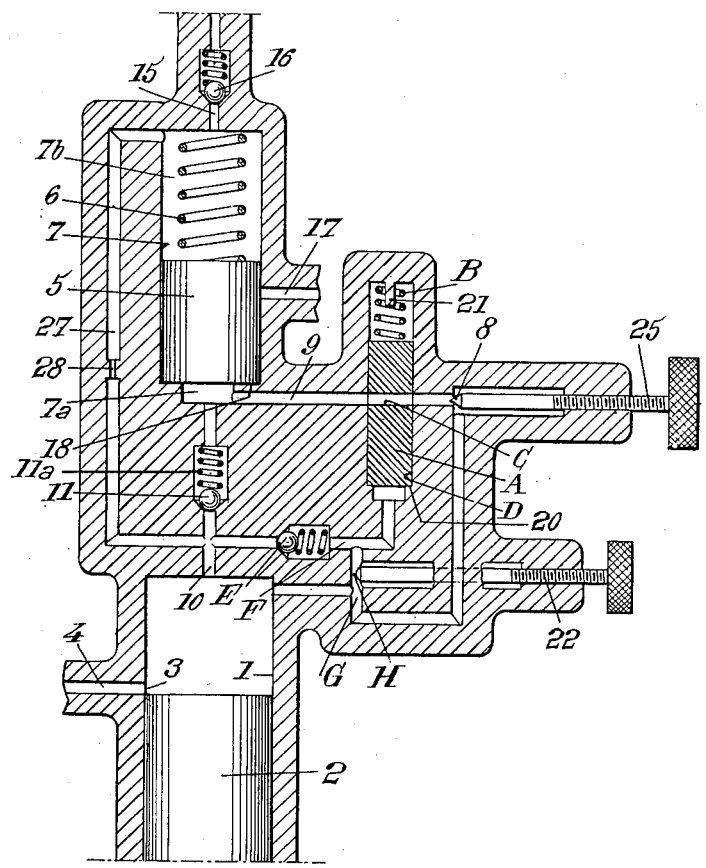

Nov. 27, 1962
P. E. BESSIERE
3,065,701
SELF-REGULATING RECIPROCATING PUMPS, AND IN PARTICULAR
IN FUEL INJECTION PUMPS FOR INTERNAL
COMBUSTION ENGINES
Filed Sept. 16, 1957
8 Sheets-Sheet 4
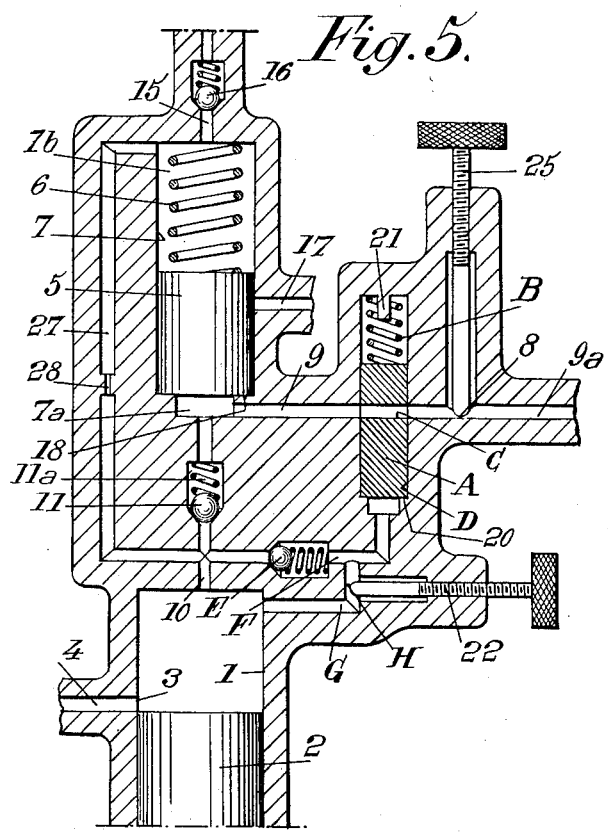
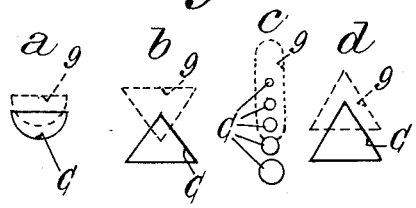
INVENTOR
PIERRE ETIENNE BESSIERE
BY
Bailey, Stephens + Huettig
ATTORNEYS

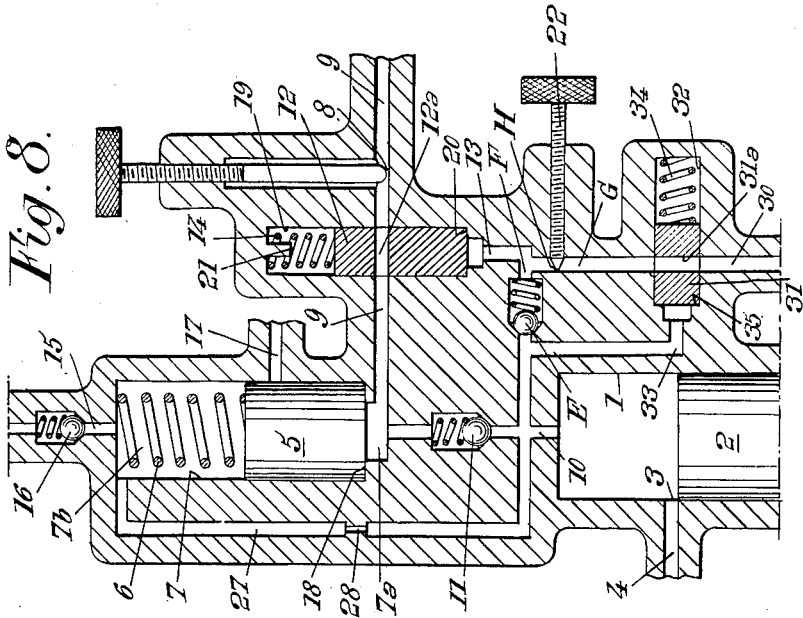
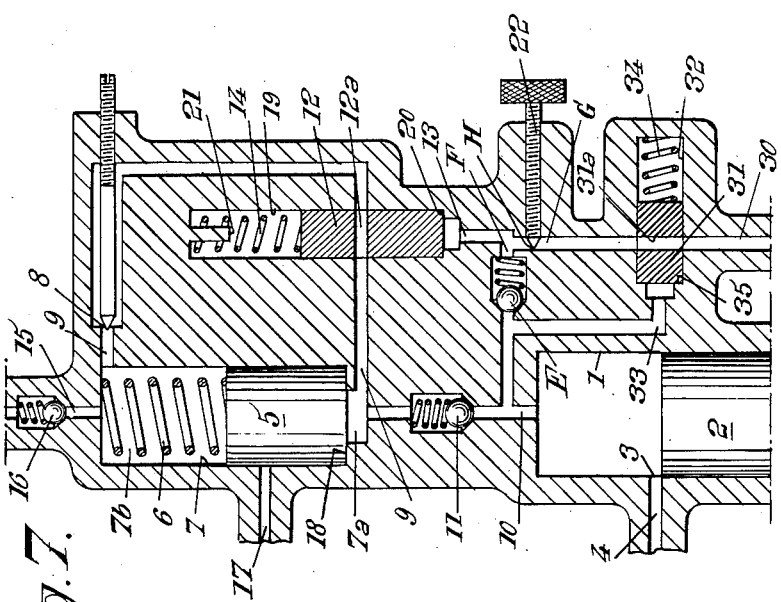

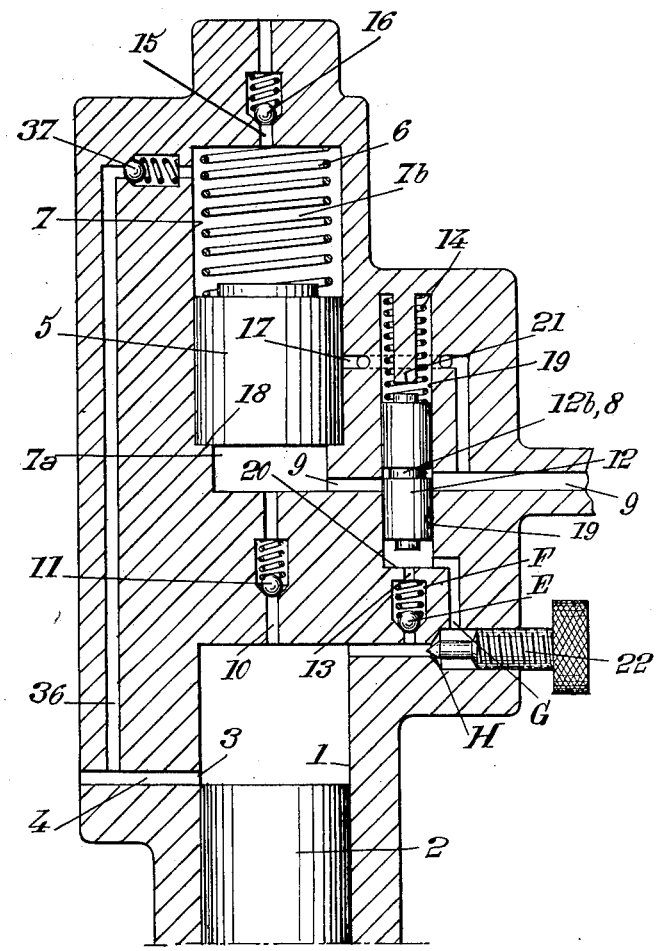

Nov. 27, 1962
P. E. BESSIERE
3,065,701
SELF-REGULATING RECIPROCATING PUMPS, AND IN PARTICULAR
IN FUEL INJECTION PUMPS FOR INTERNAL
COMBUSTION ENGINES
Filed Sept. 16, 1957
8 Sheets-Sheet 7
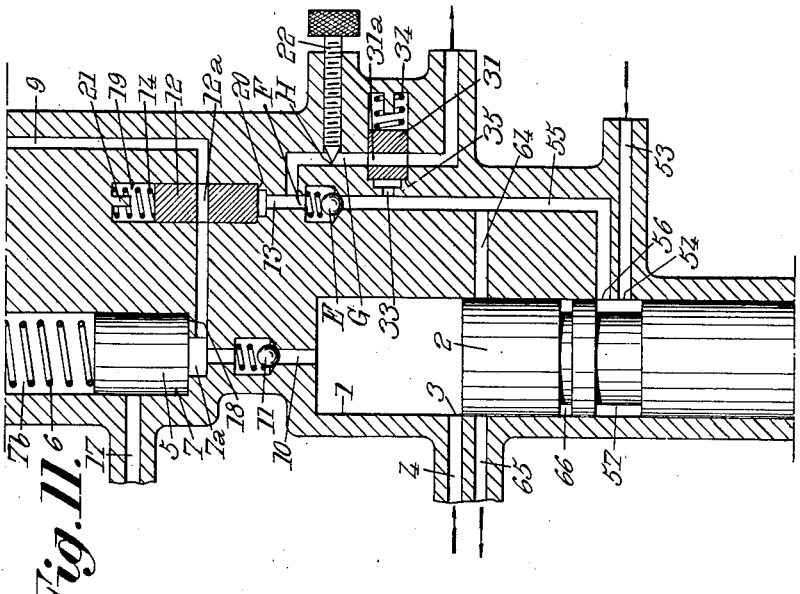
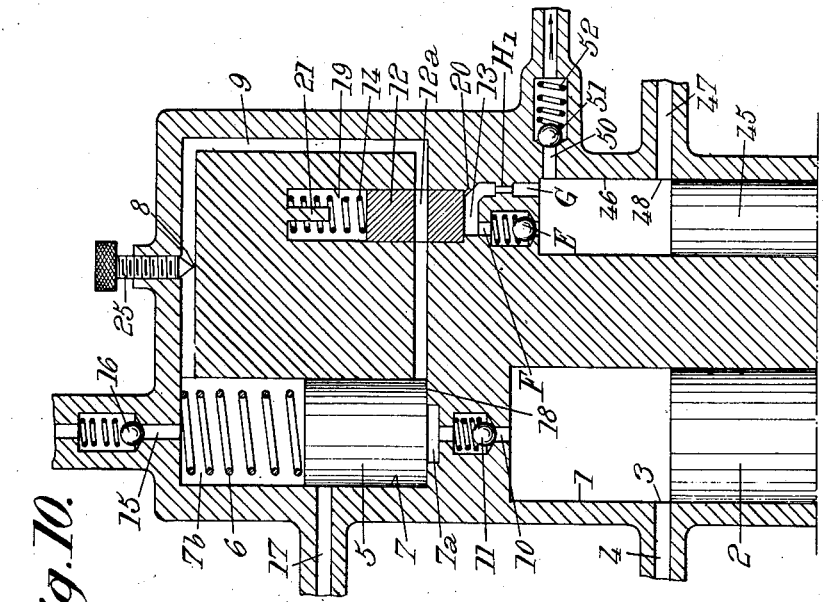
INVENTOR
PIERRE ETIENNE BESSIERE
BY
Bailey, Stephens & Huettig
ATTORNEYS

United States Patent Office 3,065,701
Patented Nov. 27, 1962

3,065,701
SELF - REGULATING RECIPROCATING PUMPS, AND IN PARTICULAR IN FUEL INJECTION PUMPS FOR INTERNAL COMBUSTION ENGINES
Pierre Etienne Bessiere, 55 Blvd. Commandant Charcot, Neuilly-sur-Seine, France
Filed Sept. 16, 1957, Ser. No. 684,236
Claims priority, application France Oct. 3, 1956
19 Claims. (Cl. 103—41)

The present invention relates to self-regulating reciprocating pumps, that is to say to the pumps the main active part of which (designated hereinafter by the term "piston" but which might be constituted by a diagphragm or an analogous element) has a reciprocating movement and the rate of feed of which (per cycle), at least within some ranges of operation, decreases when the speed at which the pump is driven increases. My invention is more especially but not exclusively concerned, among these pumps, with those intended to inject fuel into internal combustion engines, this last term including both explosion engines and diesel and similar engines.

My invention applies to pumps of this type in which a reciprocating member, for instance a secondary piston, has a forward movement under the effect of the pressure of the liquid delivered by the main piston of the pump, against return means, and in particular yielding return means such as a spring, whereas its return movement is braked by means of a throttled passage incorporated in a channel through which flows the liquid driven back by said reciprocating member during this last mentioned movement.

Such pumps are already described in my U.S. patent application Ser. No. 673,343, filed July 22, 1957 for Improvements in Reciprocating Liquid Pumps, and in Particular in Fuel Injection Pumps.

In this prior patent application, the return speed of the reciprocating member depends practically only upon the return force acting thereon and upon the dimensions of the throttled passage, which is adjusted to a predetermined value. Consequently, as long as these dimensions are not modified, the time T for the return of the reciprocating member is fixed and independent of the speed at which the main piston of the pump is driven. The regulating effect, according to this prior patent application, begins only when the time θ of the return stroke of the main piston pump (θ depending upon the speed at which the pump is being driven) becomes smaller than the time T which is practically constant, although adjustable. From this time on, there is formed under the reciprocating member a liquid abutment which shortens the return stroke of the reciprocating member and which is the greater as the time θ is smaller with respect to time T.

In order further to improve self-regulation according to the present invention, I provide, in the channel which includes the throttled passage, a restricted passage of cyclically varying size and the cross-section of which is caused to increase gradually during at least a portion of the return stroke of the reciprocating member so as constantly to obtain, during this stroke, an increase of the speed of the reciprocating member.

In order to achieve this cyclical variation, I cause the section of this restricted passage to be controlled by a movable member or slide valve driven in synchronism with the piston of the pump in the direction which corresponds to the closing of the passage, for instance under the effect of the pressure of the liquid discharged by the main piston pump during its delivery stroke or by suitable mechanical means, whereas this slide valve is urged in the opposed direction by suitable return means.

Advantageously, in order to make these pumps such that they practically cease to deliver liquid to the outside as soon as a predetermined maximum speed has been reached, the slide valve is displaced, during the stroke thereof which causes the above mentioned channel to be closed, beyond the position just sufficient to achieve this closing, and this by a distance which is preferably a multiple of the stroke just necessary to produce this closing, and, during the suction stroke of the main piston pump, the return movement of the slide valve is braked, preferably by a throttled passage provided in the return path of travel of the liquid which had previously produced said displacement of the slide valve, the force of the return means, the supplementary displacement and the braking action being such that the channel remains constantly closed by the slide valve, which practically stops any delivery of the pump as soon as the speed of said pump exceeds a predetermined maximum value.

Other features of my invention will become apparent in the course of the following detailed description of several embodiments thereof with reference to the appended drawings, given merely by way of indication, and in which:

FIGS. 1 to 5 and 7 to 12 diagrammatically show, in axial section, eleven different embodiments of injection pumps made according to my invention.

FIG. 6 shows, at $a$, $b$, $c$ and $d$, different forms of the cross-section of the channel provided in the slide valve and of the conduit cooperating with said slide valve.

The following description with reference to the drawings relates to the construction of a fuel injection pump for a diesel engine.

As in the above mentioned prior patent application, my device includes a cylinder 1 in which moves a main piston 2 driven in any suitable manner, for instance by means of a cam (such a cam being shown on FIG. 12, where it is designated by reference numeral 70). This piston cooperates with a port 3 through which the fuel feed conduit 4 opens into cylinder 1. Conduit 4 is fed from a primary pump (not shown) which collects fuel from a fuel tank.

In order to obtain an automatic regulation of the delivery of the pump as a function of the speed thereof, and, to be more accurate, in order to obtain such a regulation for values of the speed of the pump above a predetermined value, so that the engine supplied with fuel by the pump has a maximum speed which it cannot exceed, I cause at least a portion of the fuel delivered by piston 2 during its delivery stroke (upward stroke) and after the closing of port 3, to displace a reciprocating member 5, in the form of a piston slidable, against the action of a return spring 6, in a cylinder 7, and I brake the return movement of said reciprocating member, which return movement takes place during the suction stroke (downward stroke) of the main piston pump 2, by means of an adjustable throttled passage 8 interposed in conduit 9 through which must flow, when it leaves cylinder 7 during the return movement of reciprocating member 5, the fuel which has precedingly produced the forward displacement of said reciprocating member. With such an adjustable dash-pot, the return speed of member 5 depends practically only upon the return force exerted by spring 6 and upon the dimensions of the throttled passage 8. The port through which conduit 9 opens into the lower chamber 7a of cylinder 7 may be permanently opened (FIGS. 1 and 3 to 5) or it may be so positioned that member 5 closes it when said member is in its lower-most position (FIG. 2).

The inside of cylinder 1 is connected, through a conduit 10 containing a check valve 11 subjected to the action of a spring 11a, with the lower chamber 7a of cylinder 7, this conduit permitting the fuel delivered by piston 2 during its upward stroke to pass into said chamber 7a. This chamber 7a is further connected, through said conduit 9 including the throttled portion 8, either (FIGS. 1, 2 and 3) with the chamber 7b of cylinder 7 located above member 5, or (FIG. 4) with the chamber located in cylinder 1, above piston 2, or again (FIG. 5) with a conduit 9a for the return of fuel to the tank (not shown).

In the first case (FIGS. 1, 2 and 3), I further provide a valve member 12 which closes said conduit 9 during the upward stroke of piston 2 and opens it only during the downward movement of this piston.

In order to control valve 12 as above stated, said valve may be constituted by a slide valve moving in a cylinder 19 and subjected on its lower end face to the pressure existing in cylinder 1, transmitted through a conduit 13, and, on its upper end face, to the action of a return spring 14. Furthermore, this slide valve is provided with a passage 12a (FIGS. 1 and 2) extending throughout it and arranged in such manner that it is in line with conduit 9 when spring 14 has moved the slide valve to its lowermost position where it is stopped by an abutment 20 (shown by FIGS. 1 and 2). Of course, this passage 12a might be replaced by a groove 12b provided in the periphery of slide valve 12 (FIG. 3), the cross-section of this groove having possibly a sufficiently small value to constitute the above mentioned throttled passage (FIG. 9). If, as a result of the upward movement of piston 2, an overpressure is produced inside cylinder 1, this overpressure displaces slide valve 12 upwardly and thus causes conduit 9 to be closed.

In the two other cases (FIGS. 4 and 5), I provide a conduit 27 including a throttled portion 28 to connect the delivery chamber of cylinder 1 with said chamber 7b.

In all of the above mentioned embodiments (FIGS. 1 to 5), cylinder 7 is further connected with two other conduits, to wit, on the one hand the delivery conduit 15, possibly provided with a check-valve 16 and which leads to the injector or injectors fed by the pump, and on the other hand a discharge conduit 17 which is opened by reciprocating member 5 when said member has moved a given distance in the upward direction inside cylinder 7.

Finally, cylinder 7 is provided, close to its lower end, with a shoulder 18 against which member 5 is applied by spring 6, in the position of rest.

It is known that the devices which have been described are such that, within a given range of operation, the useful stroke of the reciprocating member below the opening of discharge conduit 17 in cylinder 7 decreases as the speed at which the pump is driven increases, which achieves the self-regulation effect described in the above mentioned prior patent application.

This is due to the fact that, as long as the time T for the return of member 5 is smaller than, or at most equal to, the time $\theta$ corresponding to the downward movement of the pump piston 2 ($\theta$ depending upon the speed of the engine on which the injection pump is fitted), reciprocating member 5 can move through the whole of its return stroke, so that this stroke does not undergo any variation. But if the speed of the engine increases, so that $\theta$ becomes smaller than T, member 5, before it has moved through the whole of its return stroke, is again struck by the jet of fuel delivered by the upwardly moving piston 2, this jet of fuel causing a premature upward movement of member 5, and consequently shortening the stroke thereof, the shortening being the greater as the difference $T-\theta$ is greater. In other words, as soon as $\theta$ becomes smaller than T, the fuel delivered by piston 2 forms a kind of liquid abutment for member 5, which abutment stops this member in its return stroke the sooner as the speed of the pump piston, and therefore the speed of the engine itself, is greater. This shortening of the stroke of member 5 is utilized to produce a reduction of the amount of fuel delivered by the injection pump toward the corresponding injector or injectors, this reduction being possibly important enough to prevent the engine from exceeding a predetermined speed limit.

But, according to the present invention, the efficiency of the regulation effect thus obtained is considerably improved by providing, in the conduit 9 through which liquid is delivered due to the displacement of reciprocating member 5 during its return stroke, a restricted passage the cross-section area of which undergoes a cyclical variation, this cross-section being made to increase during at least a substantial portion of the duration of said return stroke.

This restricted passage, although it may be combined with said throttled portion 8 or disposed in series therewith, must not be considered as equivalent thereto because the dimension of the throttled portion 8, although adjustable, remains constant during the whole cycle of operation, whereas the section of the restricted passage above referred to varies in the course of every cycle, this passage being closed during the forward stroke of the reciprocating member and being more and more opened during the return stroke of said member.

Advantageously, said cyclically varying restricted passage is obtained by making use of a slide valve A (which, in the construction of FIG. 1, is constituted by slide valve 12) capable of sliding transversely to a portion of conduit 9, this slide valve being subjected, on its lower end face, during the active stroke of piston 2, to the action of the pressure existing in cylinder 1 and being pushed in the opposite direction by a return spring B (which, according to the construction of FIG. 1, is constituted by spring 14). Said slide valve is provided with a passage C (also designated by 12a on FIG. 1) cooperating with the two opposed openings of conduit 9 in cylinder D (which is constituted by cylinder 19) in which slide valve A is movable.

The flow of liquid from cylinder 1 to the space below slide valve A is permitted by a check-valve E, subjected to the action of a spring e, provided in a conduit F extending between said cylinder 1 and the bottom of cylinder D, whereas a by-pass conduit G, including a restricted portion H advantageously adjustable by means of a screw 22, connects cylinder 1 with a point of conduit F located between check-valve E and cylinder D.

The ports provided respectively in slide valve A (ends of conduit C) and in cylinder D (openings of conduit 9) have corresponding shapes such that, during the downward displacement of the slide valve (which downward displacement is braked by the provision of the adjustable restricted passage H), the law of variation of the cross-section of the cyclically varying restricted passage is itself such that I obtain the desired law for the downward movement of reciprocating member 5.

It is easy to choose for this purpose the shapes and dimensions of said ports, for instance as illustrated by FIG. 6 where parts a, b, c and d indicate four arrangements which may be adopted.

I may provide an abutment 21 such that the conduit 9 starts being opened as soon as slide valve A leaves said abutment.

But it seems more advantageous, in some cases, as shown by the appended drawings, to choose the position of the abutment 21 which determines the upper position of slide valve A in such manner that slide valve A must move, from its upper position to that for which channel C starts opening conduit 9, a given distance indicated by points m and n (FIG. 1), this distance being preferably a multiple of the height of conduit 9 or, if said conduit is circular-shaped, a multiple of the diameter of said conduit and of channel C the cross-section of which corresponds to that of conduit 9. Furthermore, the force of spring B and the cross-section of the throttled portion H are chosen in such manner that, as soon as the main piston 2 of the pump is being driven at a speed above the admissible maximum speed, slide valve A can no longer move down, from its upper position, to a position sufficiently low to enable said slide valve to open conduit 9, even partly.

The device then works in the following manner, it being supposed that 12 and A designate the same sliding valve.

I will first consider the operation of said device for a speed of the pump considerably lower than the maximum limit speed and such that the time $\theta$ corresponding to the return stroke (downward stroke) of the main piston 2 of the pump is greater than the time T corresponding to the return stroke (downward stroke) of slide valve 12. It should be noted that time $\theta$ includes the time for which piston 2 is stopped in its lowest position and the time necessary for piston 2, at the beginning of its upward stroke, to close the port 3 of feed conduit 4.

After port 3 has been closed, piston 2, during its upward stroke, delivers fuel both under member 5 and under slide valve 12. As soon as port 3 is closed, said slide valve is applied against abutment 21, thus closing conduit 9. It is only subsequently that member 5 starts on its upward movement, in the course of which it delivers a portion of the fuel present in chamber 7b toward the injector or injectors. This is due to the fact that spring 11a, which acts upon check-valve 11, is given a force greater than the spring e of the check-valve E and the spring 14 of slide valve 12. The upward movement of reciprocating member 5 is stopped after said member has cleared discharge conduit 17.

When piston 2, after reaching the top of its movement, starts moving down in its cylinder, slide valve 12 starts moving in the downward direction. On the contrary, member 5 first remains in its upper position since, during the downward movement of piston 2, check-valve 11 is applied upon its seat and conduit 9 is not immediately opened, due to the braking action exerted upon the downward movement of slide valve 12 as a consequence of the provision of the throttled passage H. It is only from the time slide valve 12 has moved, in the downward direction, a distance equal to $m-n$, that this slide valve starts opening conduit 9, which enables member 5 also to move downwardly and to discharge the fuel contained in chamber 7a toward compartment 7b (FIGS. 1 to 3), cylinder 1 (FIG. 4) or the fuel tank (FIG. 5). Due to the cooperation of conduit 9 and the channel 12a of slide valve 12, and therefore to the braking of the downward movement of slide valve 12 produced by the throttled passage H, I obtain, as above stated, a gradual increase of the cross-section of conduit 9 cleared by slide valve 12, which involves a gradual increase of the speed of reciprocating member 5 in the course of its downward movement.

When the speed at which the pump is driven and consequently the speed of piston 2 increase, there comes a value of this speed for which time $\theta$ becomes smaller than time T and slide valve 12 can no longer reach its lowest position corresponding to contact with abutment 20 because, before said slide valve can reach this position, it is again struck by the jet of fuel delivered by piston 2 in the course of the next upward stroke thereof. In other words, there is formed under slide valve 12 a "liquid abutment" which is the more important as the difference between T and $\theta$ is greater.

As long as time T is only slightly greater than time $\theta$, the liquid abutment which is formed under slide valve 12 prevents said slide valve from fully clearing, at the end of its downward stroke, conduit 9. Consequently, reciprocating member 5 can still move down some distance below the opening of discharge conduit 17 and deliver some amount of fuel into the chamber 7b (FIGS. 1 and 3) from which it is delivered toward the discharge conduit 15 during the next upward stroke of member 5, this amount being however already greatly reduced.

The above described self-regulating effect is obtained even if abutment 21 is located at a level such that conduit 9 starts opening as soon as slide valve 12 leaves said abutment.

But if abutment 21 is located at a level such that slide valve 12 must first move a distance $m-n$ before conduit 9 starts being opened, I obtain the following supplementary results.

If the speed at which the pump is driven further increases, which causes the difference between time T and time $\theta$ to increase, the speed of the pump quickly reaches a value such that the liquid abutment under slide valve 12 becomes sufficiently great to reduce the downward movement of the slide valve below value $m-n$, so that conduit 9 no longer opens at all and reciprocating member 5 can no longer move below the position for which it just closes conduit 17. For values of the speed of the pump higher than this particular value, no fuel is being delivered toward conduit 15 and the injector or injectors. This particular value of the speed therefore constitutes a limit value which cannot be exceeded by the engine provided with an injection pump such as above described.

It results from the preceding explanations that from the time the liquid abutment starts being formed under slide valve 12, it is this abutment which determines the self-regulation of the pump.

The self-regulation effect including a limit value, such as obtained by means of slide valve 12, may be adjusted by acting upon the speed of the downward movement of the slide valve. For this purpose, I may adjust the cross-section of throttled passage H, for instance by means of a screw 22 (FIGS. 1, 4 and 5), or I may adjust the force of spring 14, for instance by means of a screw-threaded plug 14a (FIG. 3), the throttled passage $H_1$ being then of fixed cross-section.

The sensitivity of regulation depends upon the ratio between the displacement $m-n$ of slide valve 12 and the displacement to be undergone by said slide valve for fully clearing conduit 9, this last mentioned displacement corresponding to the width of the conduit at the place where the slide valve is mounted therein. Said sensitivity is the higher as said ratio increases. Preferably, it is chosen greater than 3. In order to vary the sensitivity, it is possible to adjust the length of said distance $m-n$ by varying the axial position of abutment 21 through means not shown on the drawing.

Concerning the gradual opening of conduit 9, it may be effected according to any desired law by giving the sections of the cooperating openings of conduit 9 and channel 12a any suitable shape (round, triangular, oval, etc., as shown by FIG. 6). It should be reminded here that, as a rule, the gradual opening of conduit 9 by slide valve 12 must take place according to a law (as a function of the stroke of the slide valve) the derivative of which is still positive. When at least one of the cooperating openings has a partly circular cross-section, this means that a maximum opening of the conduit is obtained, and slide valve 12 stops its downward movement, at the time the free section that is obtained is in the form of a semicircle (case of the two openings being of semicircular shape as shown by FIG. 6a).

In the arrangement shown by FIG. 1, there is provided in conduit 9, downstream of the cooperating openings controlled by slide valve 12, a throttled portion 8 distinct from the throttling achieved by slide valve 12 and preferably adjustable by means of a screw 25, this throttled portion 8 permitting an adjustment. Normally, the area of the free section, at the place of the throttled portion 8, must be at least equal to the maximum free section of conduit 9 at the place of the conjugated openings so that the law of gradual variation due to the cooperation of these openings is not altered.

In some cases, it may be desirable to replace the gradual opening of conduit 9, at the end of the downward movement of slide valve 12, by a sudden opening and to produce the throttling necessary to brake the downward movement of reciprocating member 5, not by the cooperating openings but by the throttled portion 8, which is then necessary and the free section of which is preferably adjustable by means of a screw 25a. Such an arrangement is illustrated by FIG. 2. According to this construction and in order to obtain a sudden opening of conduit 9, I provide in slide valve 12 a passage 23 which cooperates with a conduit 24 provided in the pump body and opening directly into cylinder 1. These two conduits 23 and 24 are disposed in such manner as to short-circuit at a given time, for instance slightly before the time slide valve 12 starts clearing conduit 9, throttled passage $H_1$, the braking action of which is thus eliminated. Slide valve 12 therefore suddenly opens conduit 9 by moving back onto its abutment 20, after having moved with the desired delay along the first portion of its downward movement. It should be noted here that, in this case, the throttled passage $H_1$ may be fixed (as indicated on FIG. 2), or adjustable once and for all before the engine is started.

The opening through which conduit 23 opens into the side wall of slide valve 12 is preferably given an axial length such that, not only does this conduit open before conduit 9, but it is kept open for the whole of the remainder of the downward movement of slide valve 12.

The distance A—B (FIG. 2) is greater than the stroke a—b of slide valve 12 so that, in the upper position of slide valve 12, conduit 23 cannot be in communication with conduit 9.

The operation of the device shown by FIG. 2 is as follows:

The main liquid abutment which ensures self-regulation is formed under the reciprocating member 5 as above described. The initial braking of the downward movement of slide valve 12 is only intended in this case to produce a limitation of the maximum speed by imposing a single limit speed. This arrangement prevents the engine from exceeding a speed above which it might be injured.

In the device shown by FIG. 1, the time available for transferring the liquid from chamber 7a to chamber 7b is the shorter as the "sensivity" of regulation is higher, as above explained. On the contrary, in the arrangement illustrated by FIG. 2, the time available to transfer the liquid from chamber 7a to chamber 7b is much longer. This is why the device according to FIG. 2 is mainly interesting for engines running at high speed or having a great number of cylinders (six or more), provided that a regulating device for a multiplicity of speeds is not necessary.

The above described operation in the case of self-regulating pumps in which fuel is made to flow from chamber 7a to chamber 7b by reciprocating member 5 during the return stroke thereof (FIGS 1, 2 and 3) also applies in the case of pumps such as shown by FIGS. 4 and 5 in which the fuel driven by member 5 from chamber 7a is returned, either into the pump cylinder (FIG. 4) or into the fuel tank (FIG. 5).

In the embodiments above described, passage G opens into cylinder 1. The pressure downstream of the throttled passage H is in this case variable since it depends upon the vacuum created by piston 2 during its return stroke, said vacuum varying with the speed at which the pump is being driven. Such an arrangement might be prejudicial to a good operation of the dash-pot acting upon the slide valve.

In order to obviate this drawback I may provide, beyond passage G, a conduit 30 leading to a chamber at a substantially contant pressure, for instance the tank above referred to. Such an arrangement is diagrammatically illustrated by FIGS. 7 and 8.

The operation of the dash-pot including the throttled passage H for braking the return movement of slide valve 12 is thus made safer since it no longer depends, for a given adjustment of screw 22, upon the variable vacuum prevailing in cylinder 1.

Advantageously, conduit 30 is controlled by a slide valve 31 capable of opening said conduit 30 during the suction stroke of piston 2 but closing it during the delivery stroke so as to avoid a parasitic leakage through throttled passage H, which might lower the pressure in cylinder 1 and thus be detrimental of a good injection. For this purpose, for instance, slide valve 31 is located in a cylinder 32 and one of its faces is subjected to the pressure existing in cylinder 1, transmitted through a conduit 33, slide valve 31 being further subjected to the action of a spring 34 capable of pushing it against an abutment 35, which determines a position where conduit 31a, extending through said slide valve, ensures the continuity of conduit 30.

It has been above explained that member 5 is given a reciprocating member corresponding to that of piston 2, the amplitude of the movement of member 5 being caused to decrease as a function of the speed at which the pump is being driven, at least within some ranges of operation of the pump. The forward (upward) stroke of member 5 is used to deliver, through feed conduit 15, the fuel introduced into the upper chamber 7b of cylinder 7.

In the preceding description, two particular solutions have been described (FIGS. 1 to 3 and FIGS. 4 and 5) for feeding fuel to chamber 7b. These solutions are further illustrated by FIGS. 7 and 8.

According to the first of these solutions, fuel is supplied to chamber 7b by reciprocating member 5 itself during its return stroke, conduit 9 being for this purpose made to open into chamber 7b (FIG. 7). According to the second solution, fuel is delivered by piston 2 to chamber 7b, and for this purpose the cylinder 1 of piston 2 is connected with chamber 7b through a conduit 27 including a throttled portion 28 (FIG. 8), conduit 9 then leading either to the fuel tank, as shown by FIG. 8, or to cylinder 1.

FIG. 9 shows a third solution according to which fuel is supplied to chamber 7b by an auxiliary pump and in particular by the pump which feeds fuel to the main pump cylinder 1 through conduit 4, as above described. For this purpose, chamber 7b is connected with said conduit 4 by a conduit 36 provided with a check-valve 37. As for conduit 9, it is arranged as illustrated by FIG. 8.

The operation is then as follows. When piston 2 moves upwardly, the cycle above described takes place, to wit: closing of conduit 9 by slide valve 12, filling of chamber 7b, compression of the liquid in chamber 7b by member 5 which is moved upwardly and injection through conduit 15 because check-valve 37 is closed. When piston 2 subsequently moves down, slide valve 12 opens conduit 9, member 5 moves downwardly and chamber 7b is filled through conduit 36.

As above explained, slide valve 12 must be controlled so that it is applied against abutment 21 at the beginning of the upward movement of piston 2 and kept in this position until the end of the upward movement of said piston, these operations being called "setting of slide valve 12".

According to the above described embodiments, this setting is ensured by a portion of the liquid placed under pressure by the main piston 2 of the pump, which causes slide valve 12 to be subjected to the very high pressures of the pump.

In order to avoid this necessity, it may be advantageous to ensure the above mentioned setting by a fluid other than that placed under pressure by the piston 2 of the pump and care is taken that the action of this other fluid on slide valve 12, during the upward movement of the piston 2 of the pump, is either produced by an auxiliary element, constituted for instance by the piston of an auxiliary pump and driven in such manner as to be in phase with the piston 2 of the pump, or is controlled by this last mentioned piston 2.

Concerning the fluid used for setting slide valve 12, it may be of the same nature as that placed under pressure by the piston 2 of the pump, that is to say it may be constituted by the fuel that is delivered by the pump. It may also be of different nature, that is to say it may be either a liquid different from the fuel compressed by the piston of the pump, or even a gas. This fluid may act either by pressure or by suction.

The device illustrated by FIG. 10 corresponds to the first case above mentioned. In other words, on FIG. 10 the action of the fluid which serves to perform the setting of slide valve 12 is produced by an auxiliary piston 45 working in a cylinder 46 to which said fluid is fed through a conduit 47 opening into cylinder 46 at 48, at a level immediately above the upper face of piston 45 when said piston is in its lowest position. If the fluid fed to the cylinder 46 consists of the fuel fed to cylinder 1, the same auxiliary pump may be used for simultaneously feeding said fuel to conduit 4 and conduit 47.

Cylinder 46 communicates with the lower end of cylinder 19 in the same manner as the cylinder 1 of FIG. 1 communicates with said lower end of cylinder 19. Furthermore, cylinder 46 is provided with a discharge conduit 50 fitted with a check-valve 51 opening in the outward direction when the pressure in cylinder 46 exceeds the force of the spring 52 which tends to keep valve 51 applied upon its seat.

In view of the fact that the force necessary to push back valve E and to set slide valve 12 may be relatively small (for instance ranging from ½ kg. to 12 kgs.), spring 52 is given a slightly greater force, for instance ranging from 2 to 20 kgs.

Auxiliary piston 45 is controlled by any suitable means so that the respective lower and upper dead center positions of the pistons 2 and 45 take place simultaneously. If piston 45 is controlled by a cam, this cam may be the same as that which controls piston 2.

As soon as piston 45, in the course of its upward movement, closes port 48, slide valve 12 is pushed upwardly against abutment 21 and closes conduit 9. Subsequently, check-valve 51 is opened and allows the excess of fluid delivered by piston 45 to escape to the outside while maintaining in cylinder 46, under slide valve 12, a pressure sufficient to keep said slide valve applied against abutment 21 during the whole of the upward stroke of piston 45. When piston 45 starts moving back in the downward direction, which time corresponds with the beginning of the return stroke of piston 2, slide valve 12 is pushed back by spring 14 toward abutment 20 and thus gradually opens conduit 9.

According to a modification of the device of FIG. 10, which modification is not shown by the drawing, I may use a single stepped piston to play the part of the two above described pistons 2 and 45.

In the pump illustrated by FIG. 11, the fluid which produces the setting of slide valve 12 comes from a source which supplies a fluid under pressure but without an alternative variation of this pressure and said fluid is controlled by the piston 2 of the pump. This source of fluid may be the auxiliary pump which also supplies fuel to the cylinder 1 of the pump or it may be any other pump, for instance of the gear type or possibly of any other suitable type. This source may also be constituted by a diaphragm pump or a piston supplying fluid to a pressure accumulator which ensures the feed of fluid under a constant pressure. I may also make use of gravity for supplying the desired pressure of the fluid.

If the source of fluid for the setting of slide valve 12 is the auxiliary pump which feeds fuel to cylinder 1, its capacity must be sufficient both to set the slide valve and to fill the chamber of cylinder 1 of piston 2, if said setting and said filling of cylinder 1 take place simultaneously.

However this condition is not required if, as supposed in the case illustrated by FIG. 11, the port 3 of feed conduit 4 is closed before the channel serving to the feed of the setting fluid is itself closed.

Concerning now the conduits for feeding and evacuating the setting fluid and the means for controlling them, they may of course be arranged in many different ways. An advantageous construction is illustrated by FIG. 11. In this construction, the setting fluid, constituted for instance by fuel supplied by the auxiliary pump serving to feed said fuel to cylinder 1, is fed through a conduit 53 to a port 54 opening into the lower part of the cylinder 1 of the pump, in which piston 2 is moving. A second conduit 55, intended to lead the setting fluid under slide valve 12, starts from said lower part of cylinder 1 at 56, port 56 being located slightly above port 54. Furthermore, the side wall of piston 2 is provided with a groove 57 located at a level such that it connects channels 53 and 55 together when the piston 2 of the pump is located in the low position illustrated by FIG. 11. The height of groove 57 is preferably such that said communication is cut off, in the course of the upward movement of piston 2, shortly after the closing of port 3 by this piston 2. Due to the communication thus established between conduits 53 and 55, the setting fluid brings slide valve 12 into the position where it is applied against abutment 21, that is to say where said slide valve closes conduit 9.

In order to brake the return displacement of slide valve 12, I provide a device analogous to that illustrated by FIG. 7. Furthermore, a discharge conduit 64 starts from the portion of conduit 55 which extends between port 56 and check-valve E, said discharge conduit 64 opening into cylinder 1 so as to be placed in communication with an outlet conduit 65 through a groove 66 provided in the side wall of piston 2. Groove 66 is so positioned that the communication between conduit 64 and conduit 65 takes place when piston 2 reaches its upper dead center position in cylinder 1.

As above stated, slide valve 12 is brought into its setting position, where it closes conduit 9 and is applied against abutment 21, when the groove 57 of piston 2, in the lowest position thereof, connects conduits 53 and 55 with each other. Previous to the setting of slide valve 12, slide valve 31 has been brought into the position where it closes discharge conduit G, spring 34 being given a force slightly smaller than that of spring 14, whereby the setting fluid has not been able to escape through conduit G. Slide valve 12 therefore remains set as long as slide valve 31 closes conduit G. When the piston 2 of the pump reaches its upper dead center position, it causes the liquid present in the portion of conduit 55 located upstream of check-valve E to be discharged through conduits 64 and 65. Slide valve 31 then returns into the position where it opens the discharge conduit G. The setting fluid which is present between check valve E and slide valve 12 can now escape through conduit G. However, this escape and consequently the return movement of piston 12 are braked by the provision of throttled passage H in said conduit G.

In a modification which is not illustrated by the drawings, instead of controlling the fluid which serves to the setting of slide valve 12 by the piston 2 of the pump, I make use of a control member distinct from this piston and driven in such manner that its action upon said fluid is analogous to that performed by said piston as just above described.

In the embodiments above described, the setting of the slide valve is obtained by making use of the pressure of the liquid delivered by the piston of the pump. The liquid used for the setting of the slide valve is therefore deduced from that delivered by the pump, which in some cases (small pumps running at very high speed, for instance) may constitute a drawback.

In order to obviate this drawback, it may be advantageous to have the setting of slide valve 12 controlled by mechanical means driven in synchronism with the piston 2 of the pump. Said piston 2 is for instance driven by a cam 70 fixed on a shaft 71, a spring 72 applying piston 2 against cam 70.

Such a construction is illustrated by FIG. 12 where the above mentioned mechanical means are constituted by a cam 74, driven at a speed proportional to that of shaft 71 and acting upon the bottom face of slide valve 12, for instance through a mechanical transmission such as a sliding push-rod 75 urged by a return spring 76. Cam 74 may be mounted either on the shaft 71 of the pump, as shown by the drawing, or upon a different shaft which may then be located close to slide valve 12, in which case cam 74 may act directly upon slide valve 12, without making use of a mechanical transmission such as push-rod 75. Shoulder 20 may be dispensed with by causing cam 74 to act as an abutment for slide valve 12, in which case push-rod 75 must be made rigid with said slide valve.

Cam 74 is given a shape such that slide valve 12 closes conduit 9 preferably during the period for which port 3 is opened by piston 2 and clears this conduit, after it has been kept closed for the whole of the delivery stroke of said piston, when the latter substantially reaches its upper dead center position.

For this purpose, it seems advantageous to make use of two distinct cams 70 and 74 and to determine the outline of cam 74 so that the displacement of slide valve 12 which causes the closing of conduit 9 takes place shortly before the end of the period of rest of piston 2 in its lower dead center position. In this case, the outlines and the respective settings of cams 70 and 74 are clearly not identical.

In order to brake the return movement of slide valve 12, this slide valve is provided with a head 77 running in a cylinder 78 from which starts the discharge conduit 30 in which is provided the above mentioned throttled passage H. Furthermore, a feed conduit 79 connected with a suitable source of liquid is provided. This source may be constituted by a tank located above cylinder 78 (and from which liquid flows under the effect of gravity) or by a pump. Advantageously, this liquid is the fuel to be fed by the pump and the source of pressure is the auxiliary pump for feeding fuel under pressure to cylinder 1. In this case, conduit 30 is connected with the fuel tank (or possibly with cylinder 1). In order to obtain a unidirectional flow through conduit 79, said conduit is provided with a check-valve 80 and/or this conduit opens into cylinder 78 at a level such that it is cleared by the head 77 when the slide valve is in its upper dead center position.

The operation of the pump of FIG. 12 is as follows:

During the delivery stroke of piston 2, conduit 9 is closed and the liquid delivered by piston 2 causes member 5 to move upwardly so as to deliver through conduit 15 the liquid contained in chamber 7b. During the return stroke of piston 2, conduit 9 is first closed, then it is gradually opened by the groove 12b of slide valve 12 and fuel is allowed to pass from chamber 7a to chamber 7b through conduit 9. If slide valve 12, braked by the provision of the throttled passage H, travels as far as its abutment 20, conduit 9 is then fully opened.

The braking of the return movement of slide valve 12, which determines the gradual opening of conduit 9, is obtained as follows. When the slide valve reaches its upper position, its head 77 clears conduit 79 and liquid is thus admitted into cylinder 78 under head 77. The return movement of the slide valve, which is produced by spring 14, is braked by said liquid which is to be discharged by head 77 through the throttled passage H of conduit 30.

The remainder of the cycle of operation is similar to what has been described.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A reciprocating action liquid pump which comprises, in combination, a pump body comprising a main cylinder, a main piston fitting slidably in said cylinder, a secondary cylinder fixed with respect to said main cylinder, a member fitting movably in said secondary cylinder to divide it into two chambers, said member being movable with respect to said secondary cylinder with a reciprocating movement parallel to the axis of said secondary cylinder, a conduit connecting one of said chambers with said main cylinder, a check valve in said conduit mounted to permit liquid to flow only from said main cylinder into said last mentioned chamber to produce delivery strokes of said member, each of said delivery strokes being followed by a return stroke, a discharge conduit starting out from said last mentioned chamber, a cylinder fixed with respect to said pump body extending through said discharge conduit so that the liquid flowing through said discharge conduit has to pass through said last mentioned cylinder, a slide valve movable in said last mentioned cylinder for controlling the flow of liquid flowing through said discharge conduit, means operatively connecting said main piston and said slide valve to cause said slide valve to move in one direction to close said discharge conduit in response to every delivery stroke of said main piston, a liquid delivery conduit starting out from the other of said chambers of said secondary cylinder, whereby liquid is delivered from said second mentioned chamber to said last mentioned conduit during said delivery strokes of said member, means opening into said second mentioned chamber to feed liquid thereto during said return strokes of said member, resilient means interposed between said third mentioned cylinder and said slide valve for urging said slide valve in the opposed direction substantially from the time said main piston is moving back, on its return stroke, and means operative on said slide valve to brake the movement thereof in said last mentioned direction.

2. A reciprocating action liquid pump which comprises, in combination, a pump body comprising a main cylinder, a main piston fitting slidably in said cylinder, a secondary cylinder fixed with respect to said main cylinder, a member fitting movably in said secondary cylinder to divide it into two chambers, said member being movable with respect to said secondary cylinder with a reciprocating movement parallel to the axis of said secondary cylinder, a conduit opening at one end thereof in one of said chambers and at the other end in said main cylinder, a check valve in said conduit mounted to permit liquid to flow only from said main cylinder into said last mentioned chamber to produce delivery strokes of said member, resilient means interposed between said secondary cylinder and said member to exert a return force on said member opposed to the action of said liquid thereon, whereby said return force produces return strokes of said member between said delivery strokes thereof, a discharge conduit starting out from said last mentioned chamber, a cylinder fixed with respect to said pump body extending through said discharge conduit so that the liquid flowing through said discharge conduit has to pass through said last mentioned cylinder, a slide valve movable in said last mentioned cylinder for controlling the flow of liquid flowing through said discharge conduit, means operatively connecting said main piston and said slide valve to cause said slide valve to move in one direction to close said discharge conduit in response to every delivery stroke of said main piston, a liquid delivery conduit starting out from the other of said chambers of said secondary cylinder, whereby liquid is delivered from said second mentioned chamber to said last mentioned conduit during said delivery strokes of said member, means opening into said second mentioned chamber to feed liquid thereto during said return strokes of said member, resilient means interposed between said third mentioned cylinder and said slide valve for urging said slide valve in the opposed direction substantially from the time said main piston is moving back, on its return stroke, and means operative on said slide valve to brake the movement thereof in said last mentioned direction, said slide valve being arranged to limit, together with said discharge conduit, during the movement of said slide valve in the said last mentioned direction, a throttled passage for the flow of liquid through said discharge conduit the cross section area of which gradually opens during at least a portion of said last mentioned movement of said slide valve.

3. A pump according to claim 1 in which said means to feed liquid to said second mentioned chamber during said return strokes of said member are constituted by said member, said first mentioned chamber of said secondary cylinder and said discharge conduit, the respective ends of said discharge conduit opening respectively into said two chambers of said secondary cylinder.

4. A reciprocating action liquid pump which comprises, in combination, a pump body comprising a main cylinder, a main piston fitting slidably in said cylinder, a secondary cylinder fixed with respect to said main cylinder, a member fitting slidably in said secondary cylinder to divide it into two chambers, said member being movable with respect to said secondary cylinder with a reciprocating movement parallel to the axis of said secondary cylinder, a conduit the respective ends of which open into one of said chambers and into said main cylinder respectively, a check valve mounted in said conduit to permit liquid to flow from said main cylinder into said last mentioned chamber to produce delivery strokes of said member, each of said delivery strokes being followed by a return stroke, a discharge conduit starting out from said last mentioned chamber, a cylinder fixed with respect to said pump body extending through said discharge conduit so that the liquid flowing through said discharge conduit has to pass through said last mentioned cylinder, a slide valve movable in said last mentioned cylinder for controlling the flow of liquid flowing through said discharge conduit, means operatively connecting said main piston and said slide valve to cause said slide valve to move in one direction to close said discharge conduit in response to every delivery stroke of said main piston, a liquid delivery conduit starting out from the other of said chambers of said secondary cylinder, whereby liquid is delivered from said last mentioned chamber to said last mentioned conduit during said delivery strokes of said member, a conduit extending between said main cylinder and said second mentioned chamber of said secondary cylinder for feeding liquid to said second mentioned chamber during said return strokes of said member, said last mentioned conduit including a throttle passage, resilient means interposed between said third mentioned cylinder and said slide valve for urging said slide valve in the opposed direction substantially from the time said main piston is moving back, on its return stroke, and means operative on said slide valve to brake the movement thereof in said last mentioned direction.

5. A pump according to claim 4 in which said discharge conduit opens into said main cylinder.

6. A pump according to claim 4 in which said discharge conduit opens to the outside of the pump.

7. A pump according to claim 1 including a liquid feed conduit opening into said main cylinder, the means to feed liquid to said second mentioned chamber including a feed conduit having one end opening in said last mentioned conduit and the other end in said second mentioned chamber, and a check valve mounted in said feed conduit to open toward said second mentioned chamber.

8. A reciprocating action liquid pump which comprises, in combination, a pump body comprising a main cylinder, a main piston fitting slidably in said cylinder, a secondary cylinder fixed with respect to said main cylinder, a member fitting movably in said secondary cylinder to divide it into two chambers, said member being movable with respect to said secondary cylinder with a reciprocating movement parallel to the axis of said secondary cylinder, a conduit the respective ends of which open into one of said chambers and into said main cylinder respectively, a check valve mounted in said conduit to permit liquid to flow only from said main cylinder into said last mentioned chamber to produce delivery strokes of said member, resilient means interposed between said secondary cylinder and said member to exert a return force on said member opposed to the action of said liquid thereon, whereby said return force produces return strokes of said member between said delivery strokes thereof, a discharge conduit starting out from said last mentioned chamber, a cylinder fixed with respect to said pump body extending through said discharge conduit so that the liquid flowing through said discharge conduit has to pass through said last mentioned cylinder, a slide valve movable in said last mentioned cylinder for controlling the flow of liquid flowing through said discharge conduit, means operatively connecting said main piston and said slide valve to cause said slide valve to move in one direction to close said discharge conduit in response to every delivery stroke of said main piston, a liquid delivery conduit starting out from the other of said chambers of said secondary cylinder, whereby liquid is delivered from said second mentioned chamber to said last mentioned conduit during said delivery strokes of said member, means opening into said second mentioned chamber to feed liquid thereto during said return strokes of said member, resilient means for urging said slide valve in the opposed direction substantially from the time said main piston is moving back, on its return stroke, and dashpot means operative on said slide valve to brake the movement thereof in said last mentioned direction, said slide valve being arranged to limit, together with said discharge conduit, during the movement of said slide valve in the said last mentioned direction, a throttled passage for the flow of liquid through said discharge conduit the cross section area of which gradualy opens during at least a portion of said last mentioned movement of said slide valve.

9. A reciprocating action liquid pump which comprises, in combination, a pump body comprising a main cylinder, a main piston fitting slidably in said cylinder, a secondary cylinder fixed with respect to said main cylinder, a member fitting movably in said secondary cylinder to divide it into two chambers, said member being movable with respect to said secondary cylinder with a reciprocating movement parallel to the axis of said secondary cylinder, a conduit the respective ends of which open into one of said chambers and into said main cylinder, a check valve in said conduit mounted to permit liquid to flow only from said main cylinder into said last mentioned chamber to produce delivery strokes of said member, resilient means interposed between said secondary cylinder and said member to exert a return force on said member opposed to the action of said liquid thereon, whereby said return force produces return strokes of said member between said delivery strokes thereof, a discharge conduit starting out from said last mentioned chamber, a third cylinder fixed with respect to said main cylinder extending transversely to said discharge conduit so that liquid flowing through said discharge conduit has to pass through said third cylinder, a slide valve movable in said pump body across said third cylinder for controlling the flow of liquid therethrough, a third conduit opening into one end of said third cylinder, means opening into one end of said third conduit to feed fluid under pressure through said third conduit to said end of said third cylinder for causing said slide valve to move in one direction to close said discharge conduit when the delivery stroke of said main piston takes place, a liquid delivery conduit starting out from the other of said chambers of said secondary cylinder, whereby liquid is delivered from said second mentioned chamber to said last mentioned conduit during said delivery strokes of said member, means opening into said second mentioned chamber to feed liquid thereto during said return strokes of said member, resilient means interposed between said pump body and said slide valve for urging said slide valve in the opposed direction substantially from the time said main piston is moving back, on its return stroke, another conduit starting out from said end of said third cylinder, and means provided in said last mentioned conduit to throttle it for braking the movement of said slide valve in said last mentioned direction, said slide valve being arranged to limit, together with said discharge conduit, during the movement of said slide valve in the said last mentioned direction, a throttled passage for the flow of liquid through said discharge conduit the cross section area of which gradually opens during at least a portion of said last mentioned movement of said slide valve.

10. A reciprocating action liquid pump which comprises, in combination, a pump body comprising a main cylinder, a main piston fitting slidably in said cylinder, a secondary cylinder fixed with respect to said main cylinder, a member fitting movably in said secondary cylinder to divide it into two chambers, said member being movable with respect to said secondary cylinder with a reciprocating movement parallel to the axis of said secondary cylinder, a conduit the respective ends of which open into one of said chambers and into said main cylinder respectively, a check valve in said conduit mounted to permit liquid to flow only from said main cylinder into said last mentioned chamber to produce delivery strokes of said member, resilient means interposed between said secondary cylinder and said member to exert a return force on said member opposed to the action of said liquid thereon, whereby said return force produces return strokes of said member between said delivery strokes thereof, a discharge conduit starting out from said last mentioned chamber, a third cylinder extending transversely to said discharge conduit so that the liquid flowing through said discharge conduit has to pass through said third cylinder, a slide valve movable in said pump body across said third cylinder for controlling the flow of liquid therethrough, a third conduit having one end opening into said main cylinder and the other into said third cylinder for causing said slide valve to move in one direction to close said discharge conduit when the delivery stroke of said main piston takes place, a check valve inserted in said third conduit and mounted to prevent the flow of liquid therethrough from said third cylinder to said main cylinder, a liquid delivery conduit starting out from the other of said chambers of said secondary cylinder, whereby liquid is delivered from said second mentioned chamber to said last mentioned conduit during said delivery strokes of said member, means opening into said second mentioned chamber to feed liquid thereto during said return strokes of said member, return means for causing said slide valve to move in the opposed direction substantially from the time said main piston is moving back, on its return stroke, another conduit having one end opening into said main cylinder and the other end into said end of said third cylinder and means provided in said last mentioned conduit to throttle it for braking the movement of said slide valve in said last mentioned direction, said slide valve being arranged to limit, together with said discharge conduit, during the movement of said slide valve in the said last mentioned direction, a throttle passage for the flow of liquid through said discharge conduit the cross section area of which gradually opens during at least a portion of said last mentioned movement of said slide valve.

11. A pump according to claim 9 in which said means for feeding fluid under pressure through said third conduit to one end of said third cylinder include an auxiliary cylinder, a piston fitting slidably in said auxiliary cylinder and means operatively connected with said main piston for actuating said last mentioned piston in synchronism with the movement of said main piston.

12. A pump according to claim 9 in which said means for feeding fluid under pressure through said third conduit to one end of said third cylinder include a conduit connetced with a source at constant pressure and distributing means operatively connected with said main piston for controlling communication between said last mentioned conduit and said third conduit.

13. A pump according to claim 9 in which said other conduit leading from said end of said third cylinder opens into said main cylinder.

14. A pump according to claim 9 including a constant pressure chamber, said third conduit opening into one end of said third cylinder being in communication with said constant pressure chamber.

15. A pump according to claim 8 in which said means operative in synchronism with said main piston for causing said slide valve to move in one direction are mechanical means operatively connected with said main piston.

16. A pump according to claim 2 in which said slide valve is movable in said first mentioned direction beyond the position for just closing said discharge conduit, the strength of said return means, the amplitude of the displacement of said slide valve beyond said last mentioned position and the action of said braking means being chosen such that said discharge conduit remains constantly closed by said slide valve for speeds of operation of said main piston exceeding a limit value.

17. A pump according to claim 1 in which said means to brake the movement of said slide valve is adjusted to produce a gradual throttling of said discharge conduit during the return strokes of said member.

18. A pump according to claim 16 in which said means to brake the movement of said slide valve is adjusted to produce a delayed but sudden, opening of said discharge conduit.

19. A reciprocating action liquid pump which comprises, in combination, means forming a variable volume chamber including a fixed part with a fluid inlet and a movable part reciprocable with respect to said fixed part to vary the volume of said chamber and adapted to pressurize the fluid contained therein, means rigid with said fixed part forming a hollow space in communication at one end with said chamber, a reciprocable member movable in said space in such manner as to be displaced therein in one direction by the pressure of the liquid driven out from said chamber into said space by said movable part during every inward stroke thereof which produces a reduction of the volume of said chamber, resilient means interposed between said fixed part and said member for exerting a return force on said member opposed to the action of the liquid from said chamber, said reciprocable member being arranged to control the amount of liquid delivered by the pump, on every reciprocation of said moving part thereof, in accordance with the amplitude of the reciprocating movement of said member, a conduit starting from said space for the flow, exclusively during the outward strokes of said moving part, of the liquid in said space having previously moved said reciprocable member in said above mentioned direction, and means for braking the return displacements of said reciprocable member taking place, in the direction opposed to that above mentioned, during said outward strokes of said moving part, said braking means forming in said conduit a throttled passage the cross section area of which is made to increase during at least a portion of every return stroke of said reciprocable member, so as to produce constantly an increase of the speed of said member during said return stroke, said braking means including a cylinder extending transversely to said conduit so that the liquid flowing through said conduit has to pass through said cylinder, and a slide valve movable in said cylinder and operative in response to the displacements of said moving part to form said throttled passage and to control it.

References Cited in the file of this patent

UNITED STATES PATENTS

| | | |
|---|---|---|
| 2,281,045 | Outin | Apr. 28, 1942 |
| 2,450,898 | Lewis | Oct. 12, 1948 |
| 2,604,109 | Tuttle | July 22, 1952 |
| 2,725,890 | Kanuch | Dec. 6, 1955 |
| 2,940,398 | Bessiere | June 14, 1960 |

FOREIGN PATENTS

| | | |
|---|---|---|
| 352,743 | Italy | Sept. 21, 1937 |
| 882,923 | Germany | July 13, 1953 |
| 1,060,300 | France | Nov. 18, 1953 |
| 1,094,031 | France | Dec. 1, 1954 |